United States Patent Office 2,963,507
Patented Dec. 6, 1960

2,963,507

NITROPARAFFIN-HYDRAZINE SALTS

Bernard Rudner and Marguerite E. Brooks, Baltimore, Md., assignors to W. R. Grace & Co., New York, N.Y., a corporation of Connecticut No Drawing. Filed Mar. 13, 1956, Ser. No. 571,360

8 Claims. (Cl. 260—501)

This invention relates to new compounds and mixtures comprising the hydrazine and substituted hydrazine addition salts of primary and secondary nitroparaffins or nitrocycloalkanes, and to their method of preparation.

The novel compounds are useful as diesel fuel additives. They are characterized by the following formula:

$$RNO_2 \cdot R'R''N_2H_2$$

where R is an alkyl, substituted alkyl, or cycloalkyl radical containing not more than seven carbon atoms (hereinafter referred to as short chain radicals), and R' and R'' are selected from the group consisting of alkyl, substituted alkyl, and aryl radicals and hydrogen. The term "substituted alkyl" is used in the conventional sense; in other words, it is used to designate such radicals as hydroxyalkyl, aralkyl, cyanoalkyl, etc.

It is well known that the primary and secondary nitroparaffins are in equilibrium with their nitronic acid form. In the case of nitromethane this equilibrium may be expressed as follows:

Upon treatment with sodium hydroxide, the sodium salt ($H_2CNOONa$) of nitronic acid is formed. The nitroparaffins are thus acidic in nature. The alkali portion of the novel addition salts of the present invention is hydrazine or alkyl or aryl substituted hydrazines. The nitromethane-hydrazine salts for example may be identified by either of the following formulas:

(1) 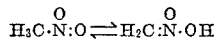

(2) $CH_3NO_2 \cdot N_2H_4$ or $H_3CNO_2 \cdot H_2NNH_2$

For simplicity, Formula 2 is of course preferable. As indicated in Formulas 1 and 2, the novel products of the present invention contain nitroparaffin and hydrazine in a molecular ratio of 1:1.

The novel compounds are prepared by contacting the short chain nitroparaffin in liquid form with hydrazine per se or one of its substituted derivatives, for example, phenylhydrazine, methylhydrazine, 1,1-dimethylhydrazine, etc., and separating the nitroparaffin hydrazine addition salt from the reaction mixture. Mixtures are prepared in like manner, omitting the isolation of a particular salt. When employing unsubstituted hydrazine, the products are generally solids which are insoluble in the starting nitroparaffin. However, when substituted hydrazines are used as reactants, the salts thus derived show a wide range of solubility characteristics. Most of these salts exhibit marked solubility in excesses of either component; in addition, they are soluble in all save the least polar common organic solvents.

All of these products appear to dissociate to a considerable extent in water. Positive proof that neutral organic solutions of the two components actually contain salts is obtained by a study of the infra-red spectra. These studies will be discussed hereinafter in the individual examples which relate specifically to compound formation.

Any common organic solvent (in which the reactants readily dissolve) that is unreactive, with respect to the products and reactants of the mixture will provide a suitable reaction medium, if such is desired.

The following non-limiting examples will further illustrate the method of preparing the novel compounds of the present invention.

EXAMPLE I

With constant agitation, we added 0.36 g. of anhydrous technical hydrazine (0.01 mol at 90% purity) incrementally into 3.0 g. of 2-nitropropane (slightly more than 0.03 mol). The mixture darkened immediately. In about five minutes the formation of tiny crystals was observed. The crystals were filtered out onto a sintered glass funnel, and washed in successive steps with 2-nitropropane, and then an equal volume of 2-propanol. They were subsequently dried under vacuum at room temperature. The loss of product observed because of volatilization while drying in vacuo is indicative of the weak bond formed between the weak acid and the weak base, as illustrated by the equation shown hereunder:

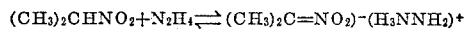

We obtained as a product transparent plates in approximately 30% yields that melted at 110° C., and subsequently decomposed with evolution of gas.

The identical product, to which we ascribed the name hydrazinium 2-propylnitronate, was obtained more conveniently and in larger quantities in the following manner: We slowly added 9.1 g. of 2-nitropropane (slightly more than 0.1 mol) in 10 ml. of 2-propanol to a chilled, stirred solution of 3.6 g. of anhydrous technical hydrazine in 5 ml. of 2-propanol. The mixture was stirred cold for two hours after addition. The crystals were filtered off, washed with a little chilled 2-propanol, and subsequently dried under 15 mm. vacuum to give a 38.2% yield of hydrazinium 2-propylnitronate.

The crystalline solid thus obtained is approximately 10% soluble in 2-nitropropane. It is slightly more soluble in hydrazine and exhibits approximately the same degree of dissociation therein. We found it to be water soluble; in water solution it behaves as if dissociated. It follows a fortiori that the addition of a saturated aqueous solution of benzaldehyde to the aqueous hydrazinium 2-propylnitronate gave an immediate precipate of benzaldazine:

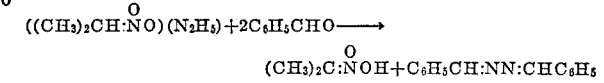

A similar reaction was used to determine the ratio of reactants in the product. We treated a 0.1 normal HCl solution of 0.001 mol of washed and dried product with an excess of salicylaldehyde as a concentrated solution in 10% alcohol. The intensely yellow salicylaldazine precipitated immediately; after subsequent separation and drying 0.221 g. of this compound was obtained. If we make proper allowance for the lack of quantitative handling, including the solubility of the azine in dilute alcohol, it is readily apparent that the hydrazine-nitropropane product is a 1:1 adduct. Ultraviolet absorption studies of the adduct and its two individual components show that the adduct has a stronger, more tenuated general absorption than either of the reactants. Infra-red absorption studies indicated that the O:N—O band had been broadened, the N—N absorption band had diminished, and a new absorption peak had been established. All of these phenomena are indicative of the formation of a hydrazine salt of a nitronic acid.

Although the adduct has been established as a 1:1 product, there is evidence that other, less definitive adducts are possible. When we carefully added weighed portions of 2-nitropropane to a weighed quantity of hydrazine, we found that a minor minimum in freezing point and solubility occurs at about 8% nitropropane–92% hydrazine. All attempts to isolate any characteristic single reaction product from the solid or from the magma failed. The absorption spectra at this minimum point was that of hydrazine and nitropropane.

EXAMPLE II

When we continuously added 0.01 mol of anhydrous technical hydrazine to 0.03 mol of nitromethane (1.8 g.), the mixture darkened, and an oily phase formed shortly thereafter. The oily phase subsequently crystallized; the solid that was formed was, like the oil that yielded it, insoluble in 2-propanol. We filtered the mixture and obtained a poor yield of hydrazinium methylnitronate:

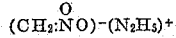

Our product was an almost colorless solid, melting at 110° C. with sublimation and decomposition. By working up the oily portion of the nitrate, we obtained additional portions of product, giving us an over-all yield of 51%. The product was found to be far more reactive than the salt of Example I. In aqueous solution, it undergoes an intramolecular oxidation-reduction reaction.

Azine formation from our novel composition of matter (as described in Example I) showed that the adduct contained equal molecular proportions of the reactants. The absorption spectra were strikingly similar to those described in Example I. Freezing point studies failed to show any depression in the 0 to 10% $CH_3NO_2$ range.

EXAMPLE III

Using the identical technique of Example II, but replacing the anhydrous technical hydrazine as a reactant and substituting therefor pure phenylhydrazine failed to produce any similar insoluble adduct. However, we found that the desired product phenylhydrazinium methylnitronate could be prepared in the following manner:

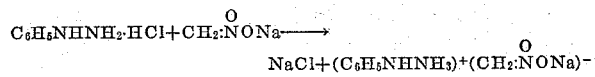

A .67 g. portion of nitromethane in 10 ml. of anhydrous methanol was treated with 0.5 g. sodium methoxide in 10 ml. of ethanol to give an ethanolic solution of sodium methylnitronate (which contained a little free nitromethane). We subsequently cooled the solution and quickly poured it into 1.4 g. of phenylhydrazine hydrochloride in 50 l. of ethanol. The mixture was stirred and evaporated in an air stream to half of its volume. It was subsequently chilled and filtered free of NaCl. We evaporated the ethanolic solution and obtained a reddish oil which represented 1.4 g. of crude phenylhydrazine methylnitronate. Unreacted nitromethane was removed from our product by washing with anhydrous ether. Our product slowly deposited as a solid; it was found to be soluble in the common solvents (except hexane and water). The addition of acid or alkali caused it to readily dissociate into its components. We discovered that upon heating, it reacted quite readily with itself, forming, among other products, aniline and ammonia.

EXAMPLE IV

A reaction similar to that of Example III, using 2-nitropropane as a reactant in lieu of nitromethane yielded a similar red oil, phenylhydrazinium 2-propylnitronate. Like its homologue (the methylnitronate prepared in Example III), it was insoluble in, and heavier than, water but soluble in common solvents. Its ultra-violet absorption spectrum showed a more intense general absorption than did the parent phenylhydrazine.

EXAMPLE V

Centimolar quantities of methylhydrazine and nitromethane, each dissolved in approximately 5 times its volume of 2-propanol, were mixed and allowed to stand until the solvent had evaporated. The residual amber oil was washed with ether to remove unreacted methylhydrazine and nitromethane. The product thus obtained, methylhydrazinium methylnitronate, was readily soluble in water and alcohol. We found it reacted quickly with acetone and acetic acid; it proved soluble in ether and alkanes. Continuous application of heat during attempts to determine a boiling point caused extensive darkening, decomposition, and gas evolution at about 100° C. The ultra-violet adsorption spectrum proved to be similar to that of the other hydrazinium nitronates; a very high adsorption at the far U.V., falling off to a broad general adsorption stronger than that of either component.

EXAMPLE VI

When we mixed equal molecular quantities of 1,1-dimethylhydrazine and 2-nitropropane in benzene we failed to obtain a salt. However, when the reactants were mixed without a solvent and subjected to a work-up procedure (treatment with ether as described in Example V) we obtained dimethylhydrazinium 2-propylnitronate in low yield. This colored oil was similar in its properties to the homologous salts with two distinguishing features: it showed a greater tendency, on warming, to dissociate into its components without decomposing, and its absorption spectrum was somewhat weaker than that of its related compounds described in the previous examples.

EXAMPLE VII

A mixture of 1-nitropropane and 1,1-dimethylhydrazine yielded as a product a light brown oil, 1,1-dimethylhydrazinium 1-propylnitronate. This product was found to be more stable thermally than its isomer, the 2-propylnitronate of the preceding example. It did not dissociate on heating; decomposition was not pronounced until about 120° C. When we saturated an aqueous solution of this new composition with potassium carbonate, it gave an upper layer of 1,1-dimethylhydrazine. The alkaline aqueous layer was shown to contain nitropropane by a positive coupling with diazotized sulfanilic acid.

Table I, hereinunder, shows the results of additional experiments wherein a hydrazine and a nitroparaffin were reacted. In all cases oils of similiar properties were obtained. Significant features of the various reactions are pointed out in the remarks column.

*Table I*

| Hydrazine | Nitroparaffin | Remarks |
|---|---|---|
| hydrazine | nitroethane | oil, no solid. |
| Do | 1-nitropropane | Do. |
| Do | nitrocyclohexane | oil, low yield. |
| methylhydrazine | do | Do. |
| 1,1-dimethylhydrazine | do | very low yield. |
| 2-hydroxyethylhydrazine | nitromethane | insoluble in nitromethane, viscous. |
| Do | 2-nitropropane | soluble in nitropropane, insoluble in ether. |
| phenylhydrazine | α-nitrotoluene | low yield, water-insoluble. |
| 1-methyl-1-phenylhydrazine | nitromethane | Do. |
| 1-benzyl-1-phenylhydrazine | do | Do. (made by metathesis) |

Our novel organic salts, and mixtures comprising nitroparaffin and hydrazines, show utility in a wide range of applications. The discrete salts, our hydrazinium nitronates, are useful intermediates. Smoother reactions have been found using our novel salts (and an additional reactant) for the preparation of known compounds of recognized utility. For example, it has been reported in the literature that hydrazine adds to nitrostyrene (prepared in two steps from benzaldehyde and nitromethane)

to yield benzaldazine and β-nitro-α-phenylethylhydrazine (shown hereunder in Equations 1 and 2).

(1)
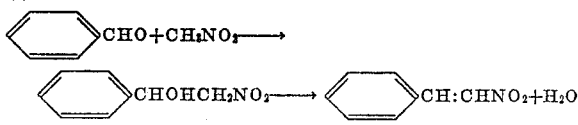

(2)
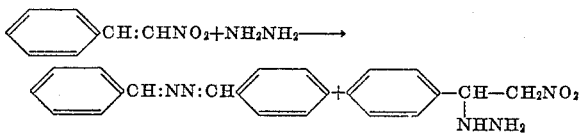

We have found that our compounds give, with aromatic aldehydes, the very interesting β-nitro-α-arylethylhydrazines directly (Equation 3).

(3)
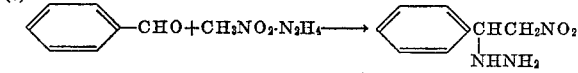

In addition to their uses as intermediates, our novel salts and mixtures (either as such or as solutions) are directly useful as fuel additives. For example, nitromethane added to hydrazine or its lower alkyl derivatives, in quantities up to approximately 25% of the weight of the base will lower the freezing point and reduce the cost of the product without generally altering the course of oxidation by nitric acid. Such a mixture is therefore of value in propellants or jet fuels. We have also found that addition of 1% by volume of 1,1-dimethylhydrazinium methylnitronate to a gasoline reduced the octane number 30%. While this is undesirable in automobile fuels, it is most desirable in diesel fuels, since anything that decreases the octane number will increase the cetane number (the laboratory yardstick of the diesel fuel performance). In other words, a diesel fuel with a high cetane rating will show improved combustibility. Our other hydrazine solutions in nitroalkanes exhibit the same effect to varying degrees.

We claim:
1. Hydrazinium nitronates having the formula $RNO_2 \cdot R'R''N_2H_2$ wherein R is lower alkyl and R' and R'' are members independently selected from the group consisting of hydrogen and lower alkyl.
2. Compounds according to claim 1 wherein R' and R'' are hydrogen.
3. Compounds according to claim 1 wherein R' is hydrogen and R'' is lower alkyl.
4. Compounds according to claim 1 wherein R' and R'' are lower alkyl.
5. Hydrazinium 2-propylnitronate.
6. Methylhydrazinium methylnitronate.
7. 1,1-Dimethylhydrazinium Methylnitronate.
8. 1,1-Dimethylhydrazinium propylnitronate.

References Cited in the file of this patent

Walther: "Journal für Praktische Chemie," vol. 53, page 449 (1896).

Panzio et al.: "Gazzetta Chimica Italiana," vol. 38, #1, pages 653–654 (1908).

Macbeth et al.: Journal Chem. Soc., page 535, 1932 (part 1).

UNITED STATES PATENT OFFICE
CERTIFICATE OF CORRECTION

Patent No. 2,963,507                         December 6, 1960

Bernard Rudner et al.

It is hereby certified that error appears in the above numbered patent requiring correction and that the said Letters Patent should read as corrected below.

Column 2, line 48, for "precipate" read -- precipitate --; column 3, lines 56 and 57, for "phenylhydrazine" read -- phenylhydrazinium --; column 4, line 11, for "soluble" read -- insoluble --.

Signed and sealed this 14th day of November 1961.

(SEAL)
Attest:

ERNEST W. SWIDER
Attesting Officer

DAVID L. LADD
Commissioner of Patents

USCOMM-DC